(12) United States Patent
Gurvich et al.

(10) Patent No.: US 12,162,228 B2
(45) Date of Patent: Dec. 10, 2024

(54) COMPOSITE STRUCTURES

(71) Applicant: Goodrich Corporation, Charlotte, NC (US)

(72) Inventors: Mark R. Gurvich, Middletown, CT (US); Georgios S. Zafiris, Glastonbury, CT (US); Joyel M. Schaefer, Earlville, NY (US)

(73) Assignee: Goodrich Corporation, Charlotte, NC (US)

( * ) Notice: Subject to any disclaimer, the term of this patent is extended or adjusted under 35 U.S.C. 154(b) by 222 days.

(21) Appl. No.: 17/485,013

(22) Filed: Sep. 24, 2021

(65) Prior Publication Data

US 2023/0099452 A1 Mar. 30, 2023

(51) Int. Cl.
*B29C 70/30* (2006.01)
*B29C 70/38* (2006.01)
*B29C 70/54* (2006.01)

(52) U.S. Cl.
CPC .......... *B29C 70/302* (2021.05); *B29C 70/382* (2013.01); *B29C 70/545* (2013.01)

(58) Field of Classification Search
CPC ....... Y10T 428/19; B32B 3/263; B32B 27/08; B32B 3/02; B29C 70/302
See application file for complete search history.

(56) References Cited

U.S. PATENT DOCUMENTS

| | | | |
|---|---|---|---|
| 4,606,961 A * | 8/1986 | Munsen | B29C 70/08 428/113 |
| 4,722,717 A | 2/1988 | Salzman et al. | |
| 2008/0145615 A1* | 6/2008 | Jacobsen | B32B 5/26 83/869 |
| 2019/0309727 A1* | 10/2019 | Girolamo | B29C 70/302 |
| 2020/0353712 A1 | 11/2020 | Cheng | |
| 2020/0378433 A1 | 12/2020 | Lewis et al. | |
| 2023/0111679 A1* | 4/2023 | Gurvich | B32B 3/263 428/116 |

FOREIGN PATENT DOCUMENTS

| | | | | |
|---|---|---|---|---|
| CN | 111255639 A | * | 6/2020 | |
| DE | 102008057708 A1 | | 5/2010 | |
| EP | 1908586 A1 | * | 4/2008 | ........... B29C 70/086 |
| EP | 2089218 A1 | | 8/2009 | |
| GB | 2601126 A | * | 5/2022 | ......... B29D 99/0025 |

(Continued)

OTHER PUBLICATIONS

[NPL-1] Kimoto et al. (Jp H09-323364 A); Dec. 16, 1997 (EPO—Machine Translation to English). (Year: 1997).*

(Continued)

*Primary Examiner* — David Sample
*Assistant Examiner* — Donald M Flores, Jr.
(74) *Attorney, Agent, or Firm* — Kinney & Lange, P.A.

(57) ABSTRACT

In accordance with at least one aspect of this disclosure, a composite structure can be formed of or including a plurality of composite strips. The plurality of composite strips include one or more filler strips which can have at least one filler edge having a filler edge geometry between a first surface and second surface, the second surface being opposite the first surface. The filler edge geometry can be configured to prevent formation of one or more gaps between one or more adjacent composite strips.

15 Claims, 11 Drawing Sheets

(56) References Cited

FOREIGN PATENT DOCUMENTS

JP 09323364 A * 12/1997
WO WO-2008068523 A1 * 6/2008 ............... B32B 3/02

OTHER PUBLICATIONS

[NPL-2] Jin et al. (CN 111255639 A); Jun. 9, 2020 (EPO machine translation to English). (Year: 2020).*
European Search Report issued in corresponding European Patent Application No. 2296415.8 on Feb. 21, 2023.
European Search Report Issued in European Patent Application No. 22196411.7 on Feb. 21, 2023.

* cited by examiner

Gap / Polymeric pocket

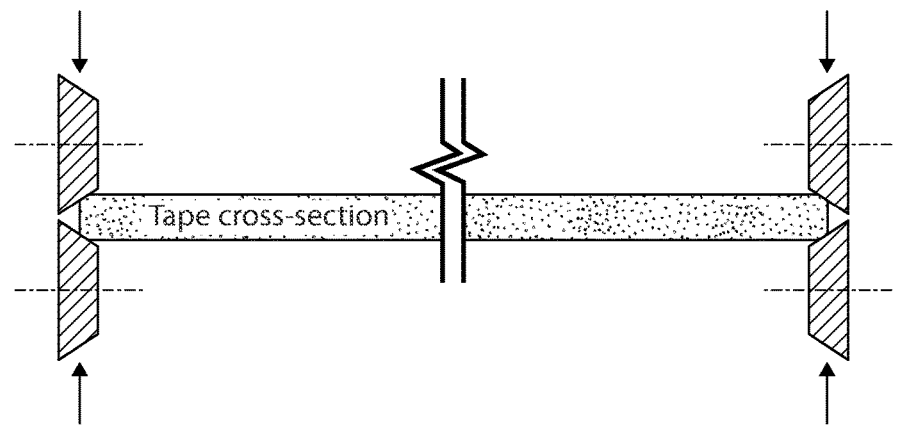
FIG. 27
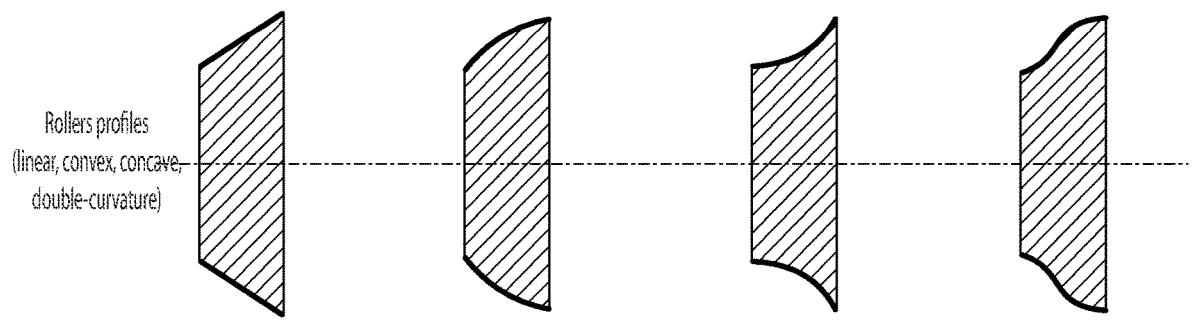
FIG. 28A  FIG. 28B  FIG. 28C  FIG. 28D

COMPOSITE STRUCTURES

FIELD

This disclosure relates to composite structures.

BACKGROUND

There are risks of damage initiation in certain composite structures (e.g., composite drive shafts) in areas of non-uniform thickness, for example, in the vicinity of ends of individual plies. Such areas are usually designed to create tapered shapes, e.g., in case of composite drive shafts, in zones of joints (to add extra thickness to compensate local stress concentrations due to metallic fasteners) or rub-rings (to add extra thickness to mitigate potential contacts), for example.

Such conventional designs and corresponding manufacturing methods and systems have generally been considered satisfactory for their intended purpose. However, there is still a need in the art for improved damage tolerance of composite structures. The present disclosure provides a solution for this need.

SUMMARY

In accordance with at least one aspect of this disclosure, a composite structure can be formed of or can include a plurality of composite strips. In embodiments, the plurality of composite strips can include a fiber-reinforced polymer-matrix. The plurality of composite strips can include one or more filler strips which can have at least one filler edge having a filler edge geometry between a first surface and second surface, the second surface being opposite the first surface. The filler edge geometry can be configured to prevent formation of one or more gaps between one or more adjacent composite strips.

The filler edge geometry can be non-straight (e.g., a non-flat, non-90 degree face) between the first surface and the second surface of the one or more composite strips. For example, the filler edge geometry can have a chamfer between the first surface and the second surface.

In certain embodiments, the at least one filler edge is a transverse end of the one or more composite strips. The one or more composite structures can include a plurality of layers sandwiching the transverse end. The transverse end can be located at a transition position where there is a change in a total amount of layers.

In certain embodiments, the filler edge geometry can be a double beveled shape having a first straight slope from the first surface to a tip, and a second straight slope from the second surface to the tip. In certain embodiments, the first straight slope and the second straight slope can have different lengths and/or slopes.

The filler edge geometry can include a curved shape having at least a first curved slope from the first surface to a tip and/or the second surface. In certain embodiments, the first curved slope can be convex. In certain embodiments, the first curved slope can be concave.

The curved shape can include a second curved slope from the second surface to the tip. The first curved slope and/or the second curved slope can be convex or concave, or a combination thereof (e.g., the first curved slope and the second curved slope can be the same or different).

In certain embodiments, the composite structure can form a beam or hollow shaft having changing layer amounts at one or more ends thereof such that the one or more ends have more total layers. In certain embodiments, the one or more composite strips form terminal layers at the one or more ends that do not extend the entire length, wherein the filler edges are located at the one or more ends of the terminal layer(s), where one or more longer layers would bend (e.g., where a resin gap would have existed otherwise). In certain embodiments, the composite strips can form a curved structure. The filler edges can be located at the one or more ends of the terminal layers, where one or more longer layers bend. Any other suitable composite structure shapes, layer arrangements, and/or purpose are contemplated herein.

In accordance with at least one aspect of this disclosure, a method can include laying a composite strip to form a composite structure, and cutting or otherwise forming at least one transverse end of the composite strip to have a filler edge having a filler edge geometry between a first surface and second surface, the second surface being opposite the first surface, the filler edge geometry configured to prevent formation of one or more gaps between one or more adjacent composite strips. In certain embodiments, cutting or otherwise forming can include cutting the end of the composite strip at a non-90 degree angle, with respect to a reinforced fiber orientation.

Cutting the end can include making a single cut to form a chamfer, or a double cut to form a double bevel with a tip. Cutting or otherwise forming can include clamping the end of the composite strip into a form. The method can include any other suitable method(s) and/or portion(s) thereof.

In accordance with at least one aspect of this disclosure, a composite strip for a composite structure can have at least one transverse end with a filler edge having a filler edge geometry between a first surface and second surface, the second surface being opposite the first surface, the filler edge geometry configured to prevent formation of one or more gaps between one or more adjacent composite strips. The filler edge geometry can be any suitable filler edge geometry as disclosed herein, e.g., as described above.

In accordance with at least one aspect of this disclosure, a composite structure can be formed of or can include a plurality of composite strips. The plurality of composite strips can include one or more filler strips which can have at least one lateral filler edge having a filler edge geometry between a first surface and second surface, the second surface being opposite the first surface. The lateral filler edge geometry can be configured to prevent formation of and/or reduce the size of one or more gaps between one or more adjacent composite strips. The filler edge geometry can be any suitable filler edge geometry disclosed herein (e.g., as described above, e.g., with respect to transverse end embodiments).

In certain embodiments, the at least one lateral filler edge can be on both lateral sides of the one or more composite strips. The one or more composite structures includes one or more of the composites strips disposed on or adjacent to another of the one or more composite strips. One or more of the at least one lateral filler edge can be located adjacent to or in overlapping contact with a substantially parallel, neighboring strip.

In certain embodiments, the composite strips can have symmetric lateral edges (e.g., having the same filler edge geometry mirrored). In certain embodiments, the composite strips can have asymmetric lateral edges such that adjacent composite strips have complimentary overlapping edges to reduce or eliminate a gap.

In certain embodiments, the structure can include a plurality of composite strips having one or more overlapping lateral edges. Any other suitable strip placement and/or arrangement to reduce or eliminate filler gap volume is contemplated herein.

In accordance with at least one aspect of this disclosure, a method can include forming at least one lateral edge of the composite strip to have a lateral filler edge having a filler edge geometry between a first surface and second surface, the second surface being opposite the first surface, the filler edge geometry configured to prevent formation of and/or reduce a size of one or more gaps between one or more adjacent composite strips. The method can also include laying parallel composite strips having lateral filler edges adjacent to or overlapping each other to form a composite structure. In certain embodiments, forming can include one or more of cutting, and/or clamping or roller clamping the end of the composite strip into a form.

In accordance with at least one aspect of this disclosure, a composite strip for a composite structure can have at least one lateral filler edge having a filler edge geometry between a first surface and second surface, the second surface being opposite the first surface, the filler edge geometry configured to prevent formation of and/or reduce a size of one or more gaps between one or more adjacent composite strips. The filler edge geometry can be any suitable filler edge geometry disclosed herein, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIGS. 9A, 9B and 9C illustrate a portion of a laminated composite structure formed using the embodiment of FIG. 7A having a filler edge, shown advanced filling without or reduced polymeric pocket (FIG. 9B) in where the residual gap in FIGS. 8A-8B would be, wherein FIG. 9C shows an embodiment of the composite structure, the bottom layer being straight, e.g., formed on a mold;

FIGS. 16A, 16B, 16C, and 16D illustrate embodiments of laminated composite structures in accordance with this disclosure, shown utilizing the embodiment of FIG. 6 and having residual gaps (polymeric pockets), wherein FIGS. 16A and 16B illustrate axial an cross-sectional view of a trough thickness, wherein FIG. 16C illustrates axial cross-sectional view of an axi-symmetric embodiment (e.g., hollow shaft), and wherein FIG. 16D illustrates a perspective view of laminated shell.

FIGS. 17A, 17B, 17C, and 17D illustrate embodiments of composite structures in accordance with this disclosure, similar to FIGS. 16A-D, respectively, shown utilizing the embodiment of FIG. 7A and having no polymeric pockets; wherein FIGS. 17A and 17B illustrate an axial cross-sectional view of a trough thickness, wherein FIG. 17C illustrates an axial cross-sectional view of an axi-symmetric embodiment (e.g., hollow shaft), and wherein FIG. 17D illustrates a perspective view of laminated shell.

FIG. 27 illustrates an embodiment of a roller clamping process in accordance with this disclosure for forming an embodiment, e.g., as shown in FIGS. 5;

FIGS. 28A, 28B, 28C and 28D illustrate certain embodiments of roller clamp profiles for forming linear, concave, convex, and complex filler edge geometries, respectively; and FIGS. 29A, 29B, 29C, 29D, and 29E, show certain embodiments of strips having lateral filler edge geometry laid up adjacent each other (e.g., axial/long direction into the page), wherein FIG. 29A shows symmetric shapes, FIG. 29B shows non-symmetric shapes, FIG. 29C shows double-curvature profiled shape, FIG. 29D shows symmetric shapes placed in an alternating up/down pattern, and FIG. 29E shows double-curvature profiled shape laid in an up/down sequence.

DETAILED DESCRIPTION

Figure 1A:
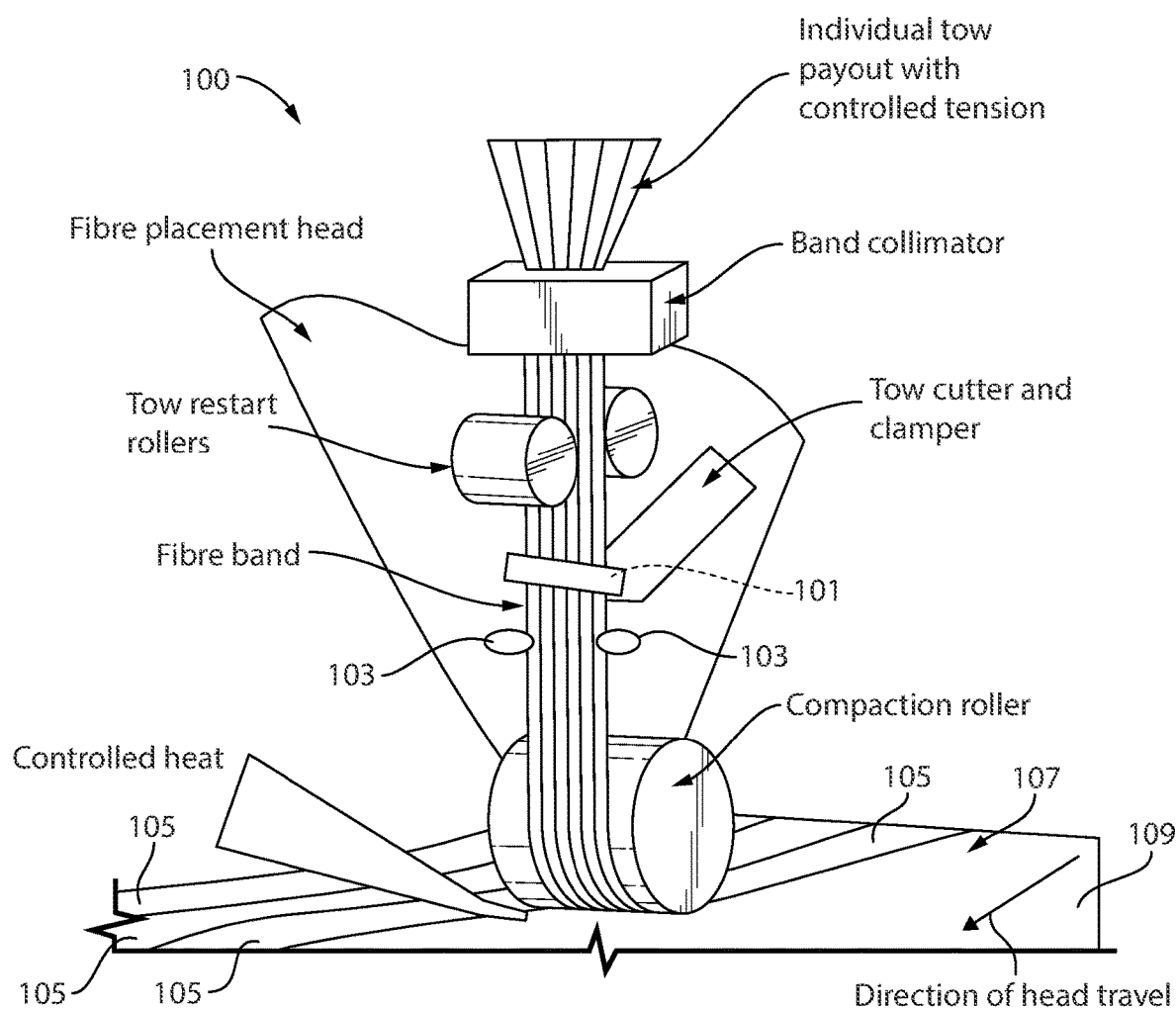
FIG. 1A is an embodiment of an Automated Fiber Placement (AFP) system in accordance with this disclosure, showing a fiber-reinforced strip being laid on a mold surface, for example.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1A and is designated generally by reference character 100. Other embodiments and/or aspects of this disclosure are shown in FIGS. 1B-29. Certain embodiments described herein can be used to make improved composite structures (e.g., for aircraft).

Referring to FIG. 1A, an Automated Fiber Placement (AFP) system 100 can include suitable components to form a strip (e.g., a tape having adhesive and/or resin, such as fiber-reinforced polymer-matrix) using a tow. The system 100 can include any suitable components appreciated by those skilled in the art of AFP, e.g., as schematically shown in FIG. 1A. The system 100 can include a cutting device 101 (e.g., a blade or laser) to cut a transverse end of the strip to form a cut strip separated from the tow.

The system 100 can additionally include a clamping device 103 to clamp (e.g., a linear clamp or roller clamp) or cut (e.g., by laser) in any suitable position to shape the edges of the tow when laying strips of the tow. The cutting device 101 can also include a clamping device associated therewith to clamp a transverse end of a strip (e.g., after cutting), for example. The system 100 can be configured to lay strips 105 along a mold surface 107 to form a composite structure having a shape of the mold 109. The system 100 can be configured to form and lay one or more embodiments of a strip disclosed below for forming a laminated composite structure.

Figure 1B:
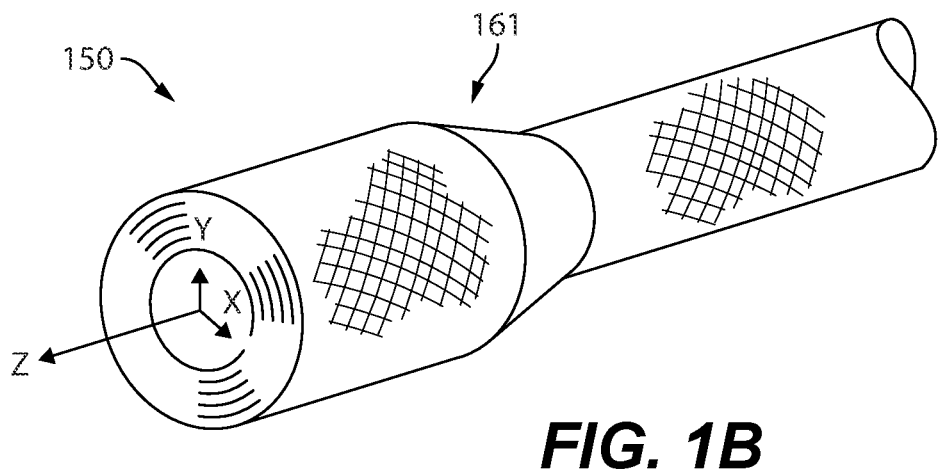
FIG. 1B shows a perspective view of an embodiment of a hollow shaft composite structure in accordance with the disclosure.
Figure 1C:
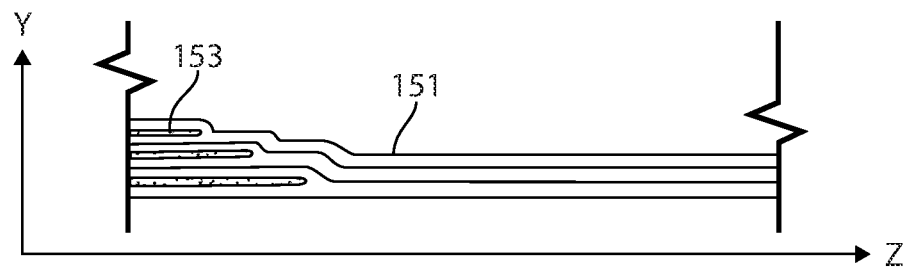
FIG. 1C shows an axial cross-sectional view of the embodiment of FIG. 1B.
Figure 1D:
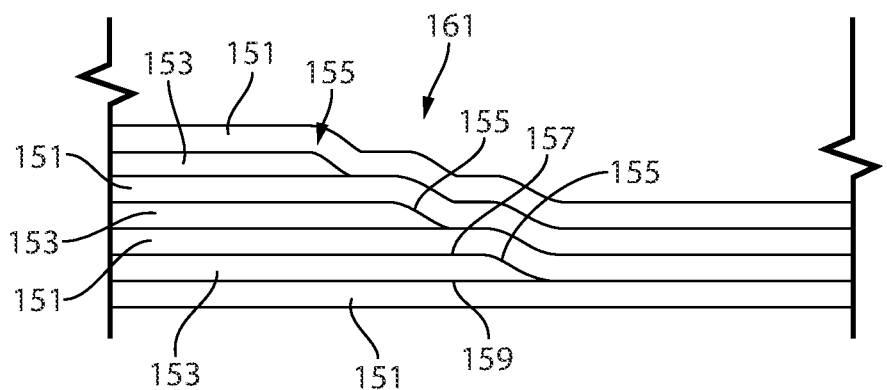
FIG. 1D shows a close up the embodiment of FIG. 1C.

In accordance with at least one aspect of this disclosure, a composite structure (e.g., structure 150 as shown in FIGS. 1B, 1C, and 1D) can be formed of or can include a plurality of composite continuous strips 151 (e.g., formed from a composite fiber-reinforced tow and/or made of fibers which can be adhered to a surface, e.g., using epoxy). The plurality of composite strips 151, 153 can include one or more filler strips 153 (e.g., discontinuous strips) of finite shorter length. Any suitable combination of continuous 151 and discontinuous 153 strips can be used to create tapered shapes 161 of desired geometries. For example, in certain embodiments, tapered shapes can be beneficial in areas where increased thickness may be needed, for example, for rivet- or bolt-based composite/metal joints. The filler strips 153 can have at least one filler edge 155 having a filler edge geometry between a first surface 157 and second surface 159, the second surface 159 being opposite the first surface 157. The filler edge geometry can be configured to prevent formation of one or more gaps between one or more adjacent composite strips (e.g., formed by a shorter length strip sandwiched by longer length strips, or formed by overlap or space between two parallel strips).

Figure 2:
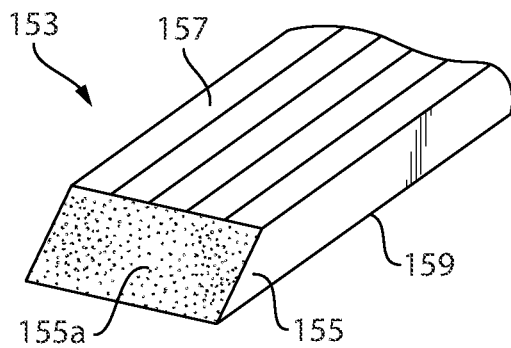
FIG. 2 is a perspective view of an end portion of an embodiment of a fiber-reinforced strip having a filler edge in accordance with this disclosure, showing a non-straight transverse edge (e.g., an axial end) having a chamfer.
Figure 6:
FIG. 6 is a through-thickness cross-sectional view of an embodiment of a fiber-reinforced strip without a filler edge, shown having a straight transverse edge or lateral edge.

Referring additionally to FIG. 2, the filler edge geometry of the filler edge 155 can be non-straight (e.g., a non-flat, non-90 degree face as shown in FIG. 6) between the first surface 157 and the second surface 159 of the one or more composite strips 153. For example, the filler edge geometry can have a chamfer, e.g., as shown in FIG. 1B and FIG. 2, between the first surface 157 and the second surface 159. The chamfer can be a straight slope 155a that connects the first surface 157 and the second surface 159, for example. In embodiments, a non-flat filler edge may not be not entirely accurate of surfaces that include flat surfaces, such as angles, for example.

In certain embodiments, as shown in FIG. 1B and FIG. 2, the at least one filler edge 155 (having a single linear slope 155a) can be a transverse end (e.g., end of the long axis, or an axial end) of the one or more composite strips 153. The one or more composite structures 150 can include a plurality of layers of strips 151 (and/or strips 153) sandwiching at through thickness of the transverse end, e.g., as shown. The transverse end (where filler edge 153 is) can be located at a transition position 161 (e.g. a tapered region) where there is a change in a total amount of layers, which can result in a change in the total amount of through thickness for the composite strips 151, 153. For example, as shown, the structure 150 has an end with more layers of strips 151, 153 that tapers down to a thinner section with less layers of strips 151. As a result, strips 153 are shorter than strips 151 and terminate within the layer structure. In certain embodiments, any suitable angle or orientations (e.g., including crossing a filler under an angle different than 90 degrees) can be used as well while maintaining a "transverse" end as described herein.

Figure 3:
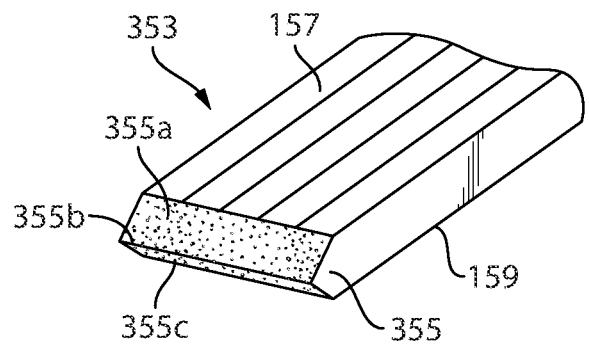
FIG. 3 is a perspective view of an end portion of an embodiment of a fiber-reinforced strip having a filler edge in accordance with this disclosure, showing a non-straight transverse edge having a double bevel.
Figure 4:
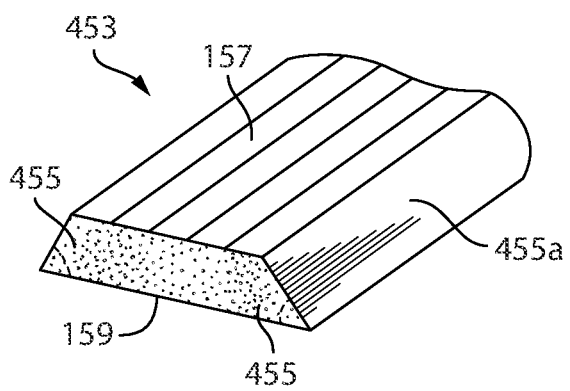
FIG. 4 is a perspective view of an end portion of an embodiment of a fiber-reinforced strip having a filler edge in accordance with this disclosure, showing both non-straight lateral edges having a chamfer.
Figure 5:
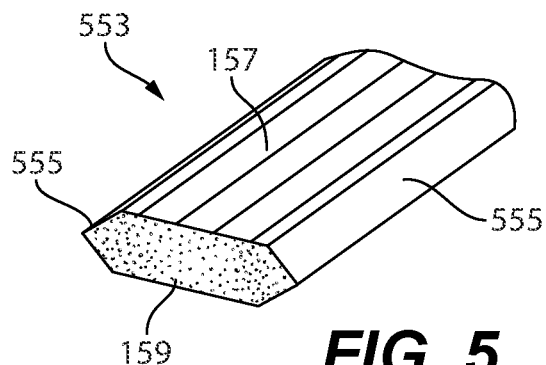
FIG. 5 is a perspective view of an end portion of an embodiment of a fiber-reinforced strip having a filler edge in accordance with this disclosure, showing both non-straight lateral edges having a double bevel.

Certain other embodiments of strips and filler edges are shown in FIGS. 3, 4, and 5, for example. For example, in FIG. 3, in certain embodiments, the strip 353 can have a filler edge 355 with filler edge geometry that can be a double beveled shape having a first straight slope 355a from the first surface 157 to a tip 355b, and a second straight slope 355c from the second surface 159 to the tip 355b. FIG. 4 shows an embodiment of a strip 453 having lateral filler edges 455 on both lateral sides with filler edge geometry similar to that of FIG. 2 having a chamfer with a single straight slope 455a. FIG. 5 shows an embodiment of a strip 553 having lateral filler edges 555 on both lateral sides similar to that of FIG. 3 having a double bevel shape.

For comparison, FIG. 6 shows a straight end without a filler geometry, which may be typically used in conventional AFP manufacturing processes. The straight end has an approximately 90 degree straight face between the first surface and the second surface. As defined herein, the term "non-straight" end does not include the embodiment shown in FIG. 6. The embodiment of FIG. 6 includes a rectangular cross-sectional shape.

Figure 7A:
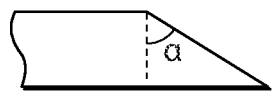
FIGS. 7A, 7B, 7C, 7D, 7E, 7F, 7G, and 7H are through-thickness cross-sectional views of embodiments of a fiber-reinforced strip having a filler edge in accordance with this disclosure.
Figure 7E:
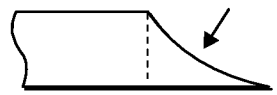
Figure 7B:
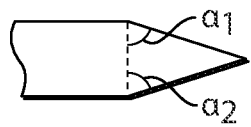

Referring to FIGS. 7A-7H, various filler edge geometries are shown. FIG. 7A shows a cross-section having a single straight slope with a single angle (alpha), e.g., similar to that of FIG. 2. FIG. 7B shows a double bevel having two straight slopes with two angles (alpha 1 and alpha 2) which can be the same or different.

Figure 7F:
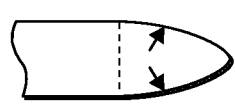
Figure 7C:
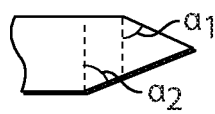

In certain embodiments, as shown in FIG. 7C, the first straight slope and the second straight slope can have different lengths and/or slopes. For example, the length of the bottom bevel is longer than that of the top bevel, and the two angles (alpha 1 and alpha 2) can be the same or different.

Figure 7G:
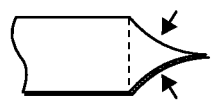
Figure 7D:
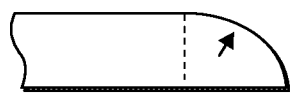
Figure 7H:
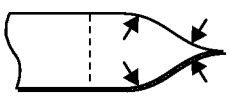

As shown in FIGS. 7D-7H, the filler edge geometry can include a curved shape having at least a first curved slope from the first surface to a tip (e.g., as shown in FIGS. 7F-7H) and/or the second surface (e.g., as shown in FIGS. 7D and 7E). In certain embodiments, the first curved slope can be convex (e.g., as shown in FIGS. 7D and 7F). In certain embodiments, the first curved slope can be concave (e.g., as shown in FIGS. 7E and 7G).

In certain embodiments, the curved shape can include a second curved slope between the second surface and the tip (e.g., as shown in FIGS. 7F-7H). The first curved slope and/or the second curved slope can be convex or concave, or a combination thereof (e.g., the first curved slope and the second curved slope can be the same or different). In certain embodiments, the curved shape can be a complex shape, e.g., as shown in FIG. 7H, having complex curved surfaces with varying slope. In certain embodiments, curvatures of the first and/or the second curved slopes can be defined by either uniform or non-uniform radii. Any suitable combinations of the above noted linear and curved segments can be applied when needed to achieve the desired properties.

Figure 8A:
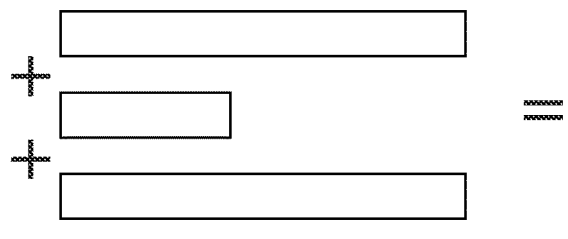
FIGS. 8A and 8B illustrate a portion of laminated composite structure formed using the embodiment with a filler edge of FIG. 6, where as a result of sandwiching between neighboring layers, a residual gap is formed as a polymeric pocket.
Figure 8B:
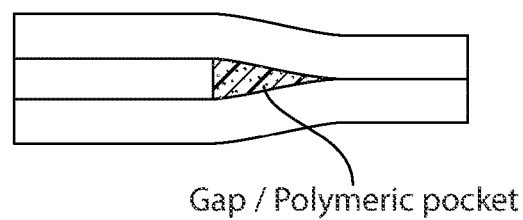
Figure 8A:
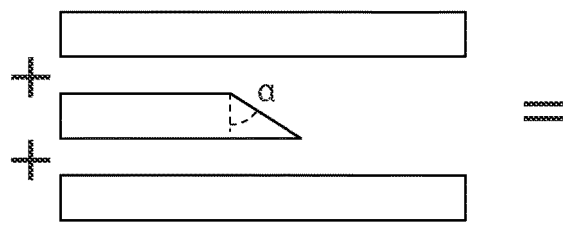
Figure 9B:
Figure 9C:
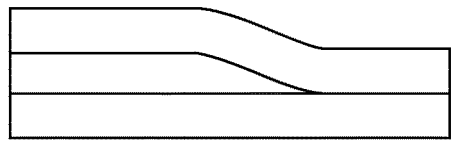

Various embodiments and their applications are described below in comparison to the straight end of FIG. 6. For example, FIGS. 8A and 8B illustrate a composite laminated structure formed using the embodiment without a filler edge, i.e., as illustrated in FIG. 6, showing a residual gap before (e.g., FIG. 8A) and after (e.g., FIG. 8B) forming. Here, embodiments can be formed with finite-length fiber-reinforced layers or strips. FIGS. 9A, 9B and 9C illustrate a composite laminated structure formed using the embodiment of FIG. 7A having a filler edge, shown filling in where the residual gap in FIGS. 8A-8B would be. FIG. 9C shows the bottom layer being straight, e.g., formed on a mold.

Figure 10:
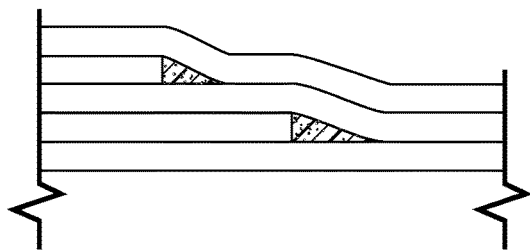
FIG. 10 illustrates a portion of a laminated composite structure (e.g., a tapered segment) formed using the embodiment of FIG. 6, showing residual gaps formed.
Figure 11:
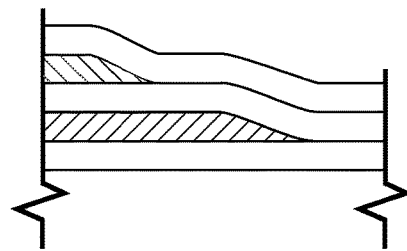
FIG. 11 illustrates the portion of a laminated composite structure similar to that of FIG. 10, formed using the embodiment of FIG. 7A, showing no gaps formed.

FIG. 10 illustrates a portion of a laminated composite structure (e.g., a tapered segment at connection end of a hollow shaft) formed using the embodiment of FIG. 6, showing residual gaps formed. FIG. 11 illustrates the portion of a composite structure similar to that of FIG. 10, formed using the embodiment of FIG. 7A, showing no gaps formed.

Figure 12:
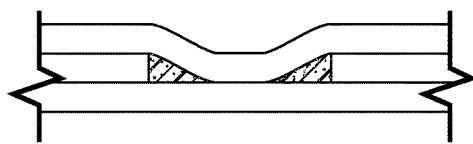
FIG. 12 illustrates a portion of a laminated composite structure formed using the embodiment of FIG. 6, wherein two edges of adjacent strips are shown spaced and showing residual gaps formed as a result.
Figure 13:
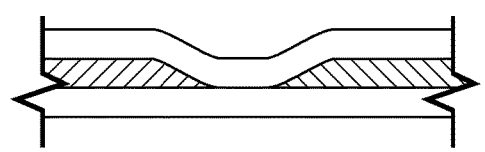
FIG. 13 illustrates the portion of a laminated composite structure similar to that of FIG. 12, formed using the embodiment of FIG. 7A, showing no gaps formed.

FIG. 12 illustrates a portion of a laminated composite structure formed using the embodiment of FIG. 6, such that two edges (e.g., lateral sides) of adjacent strips are shown spaced and showing residual gaps formed as a result. The gap can be any suitable gap, whether empty space or filled with a material. For example, in embodiments, the gaps can be filled with polymer matrix, where there no "empty" space in this, the gaps can be filled polymer matrix without reinforcement (i.e., fibers). Accordingly, as used herein, "gap" means an area without reinforcing fibers." FIG. 13 illustrates the portion of a composite structure similar to that of FIG. 12, formed using the embodiment of FIG. 7A, showing no gaps formed.

Figure 14:
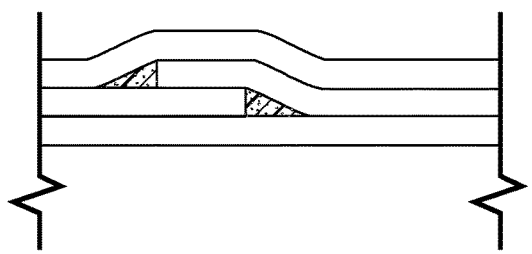
FIG. 14 illustrates a portion of a laminated composite structure formed using the embodiment of FIG. 6, wherein two edges of adjacent strips are shown overlapping, and showing residual gaps formed as a result.
Figure 15:
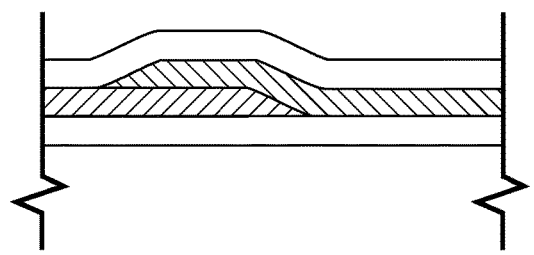
FIG. 15 illustrates the portion of a laminated composite structure similar to that of FIG. 14, formed using the embodiment of FIG. 7A, showing no gaps formed.

FIG. 14 illustrates a portion of a laminated composite structure formed using the embodiment of FIG. 6, wherein two edges of adjacent strips are shown overlapping, and showing residual gaps formed as a result. FIG. 15 illustrates the portion of a composite structure similar to that of FIG. 14, formed using the embodiment of FIG. 7A, showing no gaps formed.

FIGS. 16A, 16B, 16C, and 16D illustrate embodiments of composite structures in accordance with this disclosure, shown utilizing the embodiment of FIG. 6 and having resin pockets. FIGS. 17A, 17B, 17C, and 17D illustrate embodiments of composite structures in accordance with this disclosure, similar to FIGS. 16A-D, respectively, shown utilizing the embodiment of FIG. 7A and having no resin pockets.

Figure 16A:
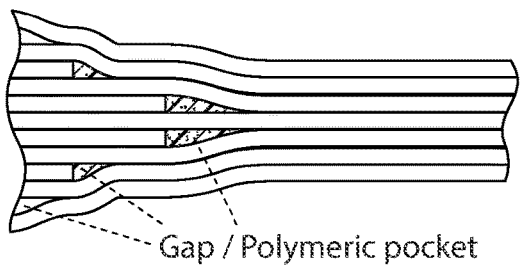
Figure 16B:
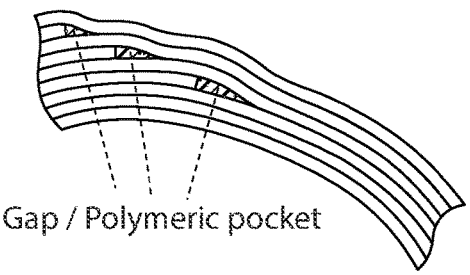
Figure 16C:
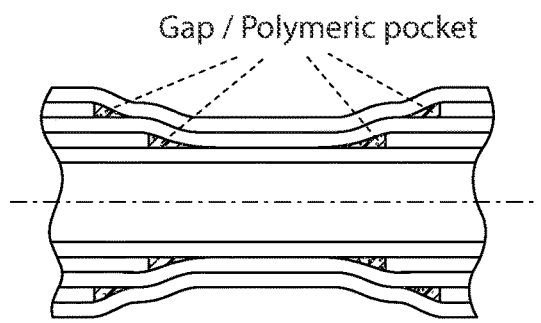
Figure 16D:
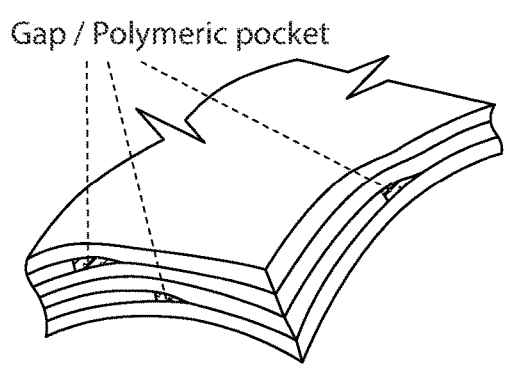
Figure 17A:
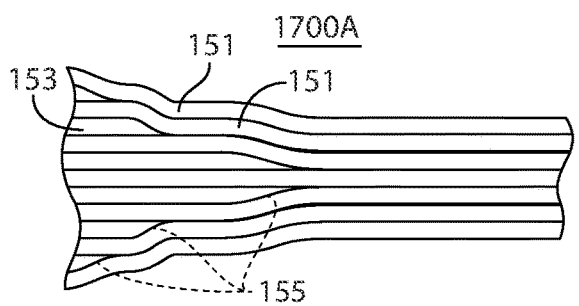
Figure 17B:
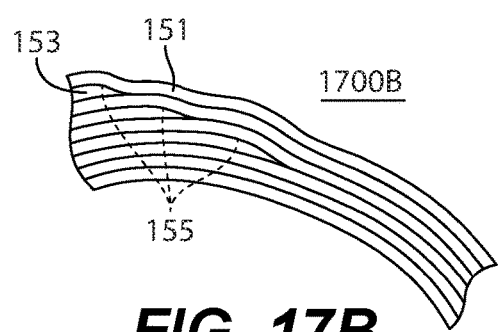
Figure 17C:
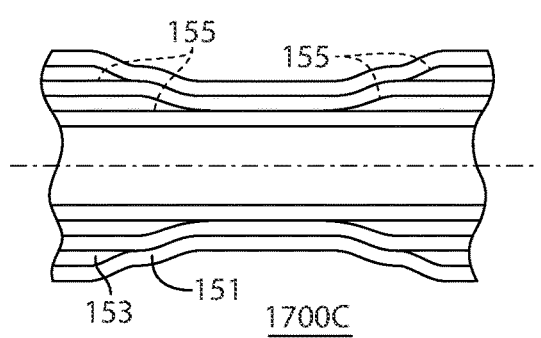
Figure 17D:
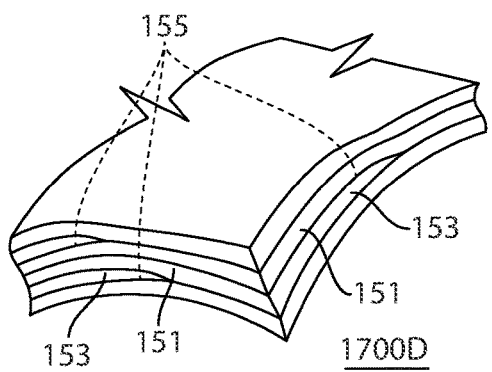

Referring additionally to FIGS. 16A-17D, in certain embodiments, the composite structure 1700A, 1700B can form a linear (e.g., FIG. 17A) or curved (e.g., FIG. 17B) laminated beam, respectively. The composite structure 1700C can form a hollow laminated component (e.g. a cylindrical shaft or beam), e.g., axi-symmteric or non-axi-symmteric tubes (FIG. 17C). Similarly, the composite structure 1700D can form a laminated curved shell of flat plate with tapered regions in one or two directions (e.g. as shown in FIG. 17D). Such embodiments can have changing layer amounts at one or more ends thereof such that the one or more ends have more total layers. In certain embodiments, e.g., as shown in FIGS. 1D, 17A-17D, the one or more composite strips 153 can form terminal layers at the one or more ends of the structure (e.g., as shown in FIGS. 1B-1D, 17A, 17B, 17C, and 17D) that do not extend the entire length (in at least one axis). As shown in FIGS. 17A-17D, the filler edges can be located where one or more longer layers 151 bend (e.g., where a polymeric and/or resin gap would have existed otherwise).

In certain embodiments, the composite strips can form a curved structure, e.g., as shown in FIG. 17B (shown curved in a single dimension) and FIG. 17D (curved in multiple dimensions). The filler edges can be located where one or more longer layers 151 bend, similar to that of FIGS. 17A and 17C. Any other suitable composite structure shapes, layer arrangements, and/or purpose are contemplated herein.

In accordance with at least one aspect of this disclosure, a method can include laying a composite strip to form a composite structure, and cutting or otherwise forming at least one transverse end of the composite strip to have a filler edge having a filler edge geometry between a first surface and second surface, the second surface being opposite the first surface, the filler edge geometry configured to prevent formation of one or more gaps between one or more adjacent composite strips. In certain embodiments, cutting or otherwise forming can include cutting the end of the composite strip at a non-90 degree angle, e.g., as shown in FIGS. 18 and 19A-19B.

Figure 18:
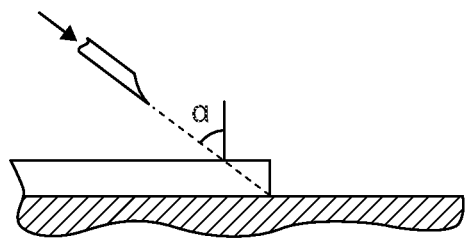
FIG. 18 illustrates an embodiment of a cutting process in accordance with this disclosure for forming an embodiment, e.g., as shown in FIGS. 2, 4, and 7A.
Figure 20:
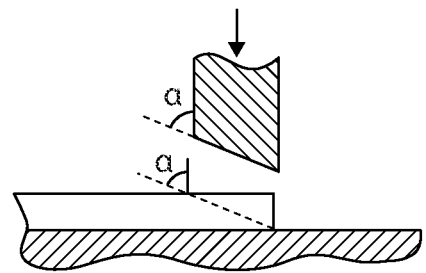
FIG. 20 illustrates an embodiment of a clamping process in accordance with this disclosure for forming an embodiment, e.g., as shown in FIGS. 2 and 4.
Figure 19A:
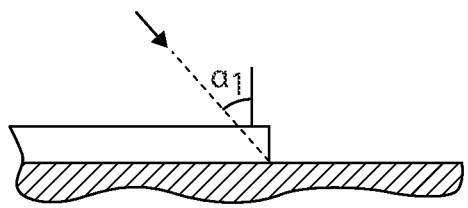
FIGS. 19A and 19B illustrate an embodiment of a cutting process in accordance with this disclosure for forming an embodiment, e.g., as shown in FIGS. 3, 5, 7B, and 7C.
Figure 19B:
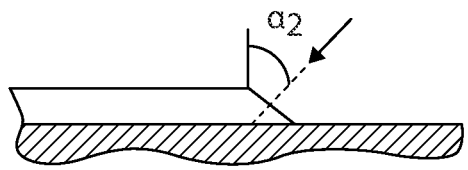
Figure 21:
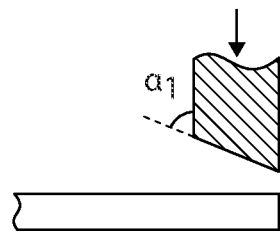
FIG. 21 illustrates an embodiment of a clamping process in accordance with this disclosure for forming an embodiment, e.g., as shown in FIGS. 3 and 5.
Figure 22:
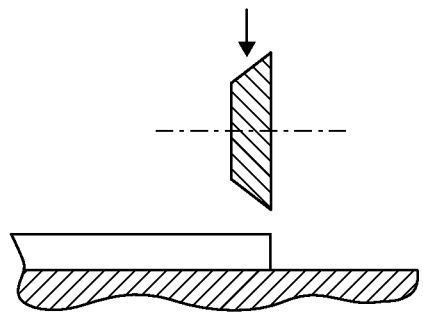
FIG. 22 illustrates an embodiment of a roller clamping process in accordance with this disclosure for forming an embodiment, e.g., as shown in FIGS. 2 and 4.

Cutting the end can include making a single cut to form a chamfer (e.g., as shown in FIG. 18), or a double cut to form a double bevel with a tip (e.g., as shown in FIGS. 19A and 19B). Cutting or otherwise forming can include clamping the end of the composite strip into a form (e.g., as shown in FIGS. 20, 21, and 22). Clamping can include single angle clamping (e.g., as shown in FIG. 20), or double angle clamping (e.g., as shown in FIG. 21). Any suitable type of cutting (e.g., with a blade, with a laser), and/or clamping, e.g., compression clamping (e.g., shown in FIGS. 20 and 21)

or roller clamping (e.g., as in FIG. 22) is contemplated herein. The method can include any other suitable method(s) and/or portion(s) thereof.

Figure 23:
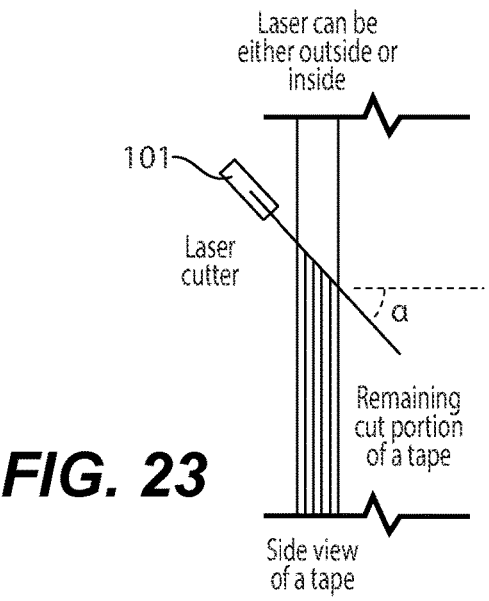
FIG. 23 illustrates an embodiment of a laser cutting process in accordance with this disclosure for forming an embodiment, e.g., as shown in FIGS. 2.

FIG. 23 illustrates an embodiment of a laser cutting process in accordance with this disclosure for forming an embodiment, e.g., as shown in FIGS. 2. As shown, the system 100 can include a single laser cutter 101 that can be positioned to cut a transverse end of the strip at a single angle.

Figure 24:
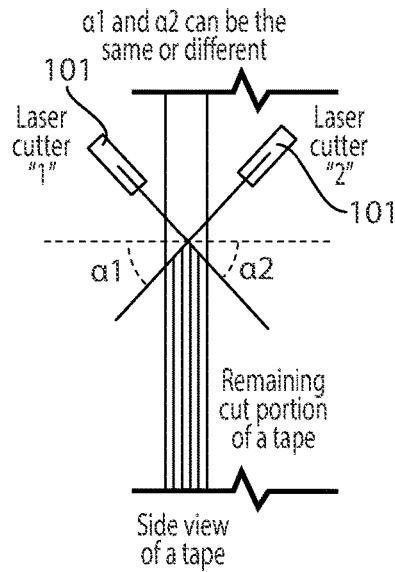
FIG. 24 illustrates an embodiment of a laser cutting process in accordance with this disclosure for forming an embodiment, e.g., as shown in FIGS. 3.

FIG. 24 illustrates an embodiment of a laser cutting process in accordance with this disclosure for forming an embodiment, e.g., as shown in FIGS. 3. As shown, the system 100 can include two laser cutters 101 that can be positioned to cut a transverse end of the strip at two angles (the same or different) to form a double bevel.

Figure 25:
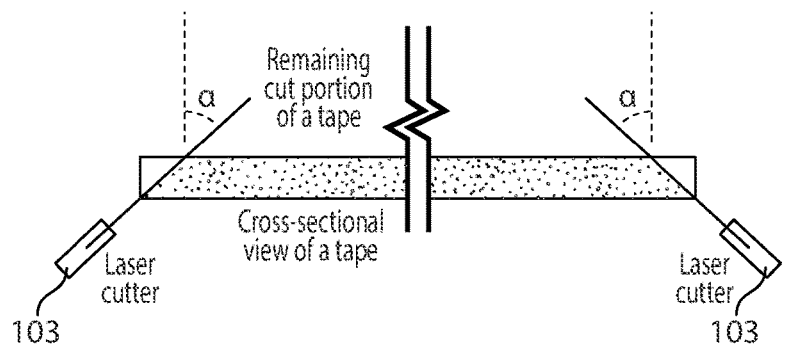
FIG. 25 illustrates an embodiment of a laser cutting process in accordance with this disclosure for forming an embodiment, e.g., as shown in FIGS. 4.

FIG. 25 illustrates an embodiment of a laser cutting process in accordance with this disclosure for forming an embodiment, e.g., as shown in FIG. 4. As shown, the system 100 can include two laser cutters 103 that can be positioned to cut each lateral edge of the strip at a single angle to form a chamfer on each lateral side.

Figure 26:
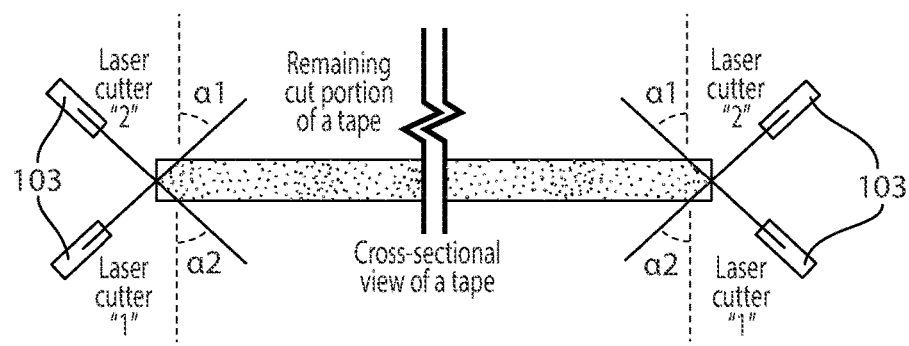
FIG. 26 illustrates an embodiment of a laser cutting process in accordance with this disclosure for forming an embodiment, e.g., as shown in FIGS. 5.

FIG. 26 illustrates an embodiment of a laser cutting process in accordance with this disclosure for forming an embodiment, e.g., as shown in FIG. 5. As shown, the system 100 can include four laser cutters 103 that can be positioned to cut a transverse end of the strip at two angles to form a double bevel on each lateral side.

FIG. 27 illustrates an embodiment of a roller clamping process in accordance with this disclosure for forming an embodiment, e.g., as shown in FIG. 5, e.g., to form a double bevel. FIGS. 28A, 28B, 28C, 28D illustrate certain embodiments of roller clamp profiles for forming linear, concave, convex, and complex (e.g. a double-curvature) filler edge geometries, respectively. Any suitable shapes to form any suitable filler edge is contemplated herein.

In certain embodiments, top and bottom rollers can have the same or different profiles. In certain embodiments, left and right lateral sets of rollers can be symmetric or anti-symmetric.

While certain filler edge geometries are shown and described above, and suitable shape to fill in a gap (e.g., a resin pocket) formed in a composite structure is contemplated herein. While embodiments having transverse end filler edges and lateral filler edges are shown, and suitable lateral and/or transverse ends can have filler edges, separately or together. For example, a single lateral filler edge and a single transverse filler edge can be combined. In certain embodiments, all edges and ends can be filler edges. Any combination of embodiments is contemplated herein.

In accordance with at least one aspect of this disclosure, a composite strip (e.g., filler strips 153 or 453 as shown in FIGS. 2 and 4) for a composite structure (e.g., structure 150) can have at least one transverse end (e.g., one or both cut ends) with a filler edge (e.g., as described above) having a filler edge geometry between a first surface and second surface, the second surface being opposite the first surface, the filler edge geometry configured to prevent formation of one or more gaps between one or more adjacent composite strips. The filler edge geometry can be any suitable filler edge geometry as disclosed herein, e.g., as described above.

Referring to FIGS. 29A-29E, in accordance with at least one aspect of this disclosure, a composite structure can be formed of or can include a plurality of composite strips. The plurality of composite strips can include one or more filler strips (e.g., strips 353 and 553 as shown in FIGS. 3 and 5) which can have at least one lateral filler edge having a filler edge geometry between a first surface and second surface, the second surface being opposite the first surface. The lateral filler edge geometry can be configured to prevent formation of and/or reduce the size of one or more gaps between one or more adjacent composite strips. The filler edge geometry can be any suitable filler edge geometry disclosed herein (e.g., as described above, e.g., with respect to transverse end embodiments).

Figure 29A:
Figure 29B:
Figure 29C:
Figure 29D:
Figure 29E:

FIGS. 29A, 29B, 29C, 29D, and 29E show certain embodiments of strips having lateral filler edge geometry laid up adjacent each other (e.g., axial/long direction into the page). FIG. 29A shows an embodiment having flat edges. a. FIGS. 29B and 29C show non-symmetric shapes, and FIGS. 29D and 29E show symmetric shapes places in an alternating up/down pattern. In certain embodiments, the strips can have nesting concave/convex shapes or alternating convex and concave filler edge geometry strips that mate with each other. FIGS. 29B and 29D show linear slope edges. FIGS. 29C and 29E show non-linear curved slope edges. FIG. 29D shows a trapezoidal shape laid in an up/down sequence (e.g., two AFP arms can be used in parallel). FIG. 29E shows double-curvature profiled shape laid in an up/down sequence (e.g., two AFP arms can be used in parallel). In embodiments, the convex/concave edges can be curved or double-slope shapes, and the convex/convex with concave/concave sequence can have two AFP arms used in parallel.

In certain embodiments, the at least one lateral filler edge can be on both lateral sides of the one or more composite strips (e.g., as shown in FIGS. 4 and 5). As shown in FIGS. 13 and 15, the one or more composite structures includes one or more of the composites strips disposed on or adjacent to another of the one or more composite strips. Each lateral filler edge can be located adjacent to (e.g., as shown in FIG. 13) or in overlapping contact with (e.g., as shown in FIG. 15) a substantially parallel strip.

In certain embodiments, the composite strips can have symmetric lateral edges (e.g., having the same filler edge geometry mirrored), e.g., as shown in FIGS. 29D-29E. In certain embodiments, the composite strips can have asymmetric lateral edges such that adjacent composite strips have complimentary overlapping edges to reduce or eliminate a gap, e.g., as shown in FIGS. 29B and 29C.

In certain embodiments, the structure can include a plurality of composite strips having one or more overlapping lateral edges (e.g., as shown in FIGS. 15 and 29B-29E). Any other suitable strip placement and/or arrangement to reduce or eliminate filler gap volume is contemplated herein.

In accordance with at least one aspect of this disclosure, a method can include forming at least one lateral edge of the composite strip to have a lateral filler edge having a filler edge geometry between a first surface and second surface, the second surface being opposite the first surface, the filler edge geometry configured to prevent formation of and/or reduce a size of one or more gaps between one or more adjacent composite strips. The method can also include laying parallel composite strips having lateral filler edges adjacent to or overlapping each other to form a composite structure (e.g., as shown in FIGS. 13, 15, and 29B-29E). In certain embodiments, forming can include clamping or roller clamping the end of the composite strip into a form.

In accordance with at least one aspect of this disclosure, a composite strip for a composite structure can have at least one lateral filler edge having a filler edge geometry between a first surface and second surface, the second surface being opposite the first surface, the filler edge geometry configured to prevent formation of and/or reduce a size of one or more gaps between one or more adjacent composite strips. The filler edge geometry can be any suitable filler edge geometry disclosed herein, e.g., as described above.

Embodiments include a method of making composite drive shafts with enhanced damage tolerance. Embodiments can use Automated Fiber Placement (AFP). Embodiments can be applicable to any suitable composite structure. Embodiments can allow for a reduction of damage risk in composite drive shafts with non-uniform thickness, e.g., made with AFP manufacturing processes. During the AFP manufacturing process, embodiments can be constructed by placing fiber-reinforced composite layers on molds or mandrels in an automated fashion using a number of separate small width strips of thermoset or thermoplastic pre-impregnated materials to form composite layups. In embodiments, other composite manufacturing methods may be used to create fiber-reinforced polymer-matrix composite strips or layers with finite width or/and length.

Embodiments of a method lay strips like a tape. Short ply layers have finite length and cause formation of resin pockets due to straight end termination. These resin filled pockets are weaker than fiber and create weakness points, and lower damage tolerance in both initiation and damage growth. Embodiments can use a strip/tape made up of a tow of carbon fiber, glass fiber, organic fiber, or any other suitable fiber, as well as polymers such as thermosets and thermoplastics. Embodiments can include a non-sharp transversal edge with a double slope, a non-sharp transversal edge with a single slope, non-sharp longitudinal edge with a double slope on each side of the tape, and/or a non-sharp longitudinal edge with a single slope on each side of the tape.

Embodiments of strips and be formed during layup. Embodiments can be cut in one direction, cut in two directions (e.g., in a two-step process), formed by clamping from one side, formed by clamping from both sides, formed by "roller" clamps from one or both sides, and/or formed by clamping and then cutting of remaining "squeezed" part.

Embodiments can be utilized to make drive shafts (DS) made of advanced fiber-reinforced polymer-matrix composite materials. While composite materials do provide significant weight reduction, there are significant challenges associated with their structural integrity, namely in areas of non-uniform thickness. Such areas are used typically in zones of a) joints (extra thickness to compensate stress concentration due to fasteners), b) rub-rings (extra thickness to mitigate potential contacts), or c) belts for reinforcement in the circumferential directions for buckling resistance enhancement.

Drive shafts may exhibit through-thickness gaps between neighboring plies in such zones, where the gaps can be filled by the polymer matrix. Since stiffness of the polymer is much lower than stiffness of fiber-reinforced plies, there may be additional stress concentrations under applied load in such zones. Although such gaps can be eventually filled with the polymer matrix, there are no reinforced fibers inside the gaps and, therefore, they are typical locations of stress concentrations due to differences in stiffness between fiber-reinforced strips and non-reinforced gaps. Due to these stress concentrations, the gaps are among the most probable locations for damage initiation and growth.

Additional thickness is implemented by short plies with finite length generating considerable resin pockets at their ends. Such resin pockets can be seen on actual micrographs. These resin pockets are prime sources of damage initiation and follow-up damage growth for a typical damage pattern. Resin pockets are the most dangerous for damages due to stress concentrations in their areas because of big differences in stiffness of the resin itself and fiber-reinforced plies. Thus, embodiments allow enhanced damage tolerance in composite DS and other structures to cause a reduction of damage initiation risks.

Certain structures can be made with AFP, allowing an efficient way of making shafts with non-uniform thickness (among other benefits of AFP). The Conventional AFP implementations result in narrow plies, having rectangular shapes with sharp straight edges (e.g., as shown in FIG. 6). In other words, conventional AFP also has the same problem with resin pockets and high risk of damage initiation in these areas.

Embodiments includes designs and methods of making such designs. In contrast with a conventional design with sharp "rectangular" shapes of individual AFP-generated plies (e.g., as shown in FIG. 6), embodiments include non-sharp edges (e.g., FIGS. 2-FIG. 5). Designs shown in FIGS. 2 and 3 illustrate shape modification for a transversal edge, and FIGS. 4 and 5 for lateral/longitudinal edges, for example. There can be combinations of both locations for shape modifications, i.e., at both transversal and longitudinal edges. In addition, there can be modifications by two slopes (e.g., FIGS. 3 and 5) or with one slope (e.g., FIGS. 2 and 4).

Such non-sharp edges can provide a significant difference in post-curing or post-consolidation implementations. Embodiments of structures using embodiments of strips may have little or no resin pockets, while the conventional methods still have a large concentration of resin (polymer) as a source of damages due to considerable stress concentration. Similar advantage verse the conventional design is illustrated at FIGS. 10-15 for zones with monotonic increased thickness (FIGS. 10 and 11), reduced thickness (FIGS. 12 and 13) and local thickness increase (FIGS. 14 and 15). More advanced shapes of non-sharp edges are listed, among others, in FIGS. 7A-7H (which are applicable to both transversal and longitudinal/lateral edges).

Embodiments can be applied to a broad range of composite structures, such as tapered straight (or almost straight) components (e.g., FIG. 16A), tapered curved components (e.g., FIG. 16B), tapered hollow components (with open or closed cross-section), e.g., drive shafts themselves or other tubular designs (e.g., FIG. 16C), and double-curvature (double-tapered) components (e.g., FIG. 16D).

Embodiments of methods can include cutting of ply edges before or during layup by AFP. FIGS. 18-19B illustrate potential implementations by cutting of ply edges according to desired shapes. FIGS. 20-21 show a manufacturing method by clamping of edges for desired shape, and FIG. 22 illustrates a roller clamping method. Embodiments can utilize combined clamping and cutting, for example, by cutting of excessive material after clamping.

Embodiments are applicable to both thermoplastics (TP) and thermoset (TS) polymeric matrices in considered fiber-reinforced composites, for example. In the case of TP implementation, polymer consolidation may be used in the post-layup stage, while for TS, curing may be used. With respect to reinforced fibers, carbon, glass, organic and other high-strength fibers known in the field may be used.

Embodiments can enable mass production of complex composite structures using AFP, for example. Embodiments can provide improved damage tolerance through reduced risks of either damage initiation or growth or both. Embodiments can provide improved damage tolerance for pristine composite DS and also, during service, e.g., with potential impact damages. Improved damage tolerance is associated with longer service, reduced maintenance/inspection cost, reduced weight, and reinforcement of reputation in field of composite aircraft drive systems.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A composite structure formed of or including a plurality of fiber-reinforced polymer-matrix composite strips configured for use with an automated fiber placement (AFP) system, wherein the plurality of fiber-reinforced polymer-matrix composite strips includes a first filler strip and a second filler strip disposed adjacent to the first filler strip, wherein each of the first filler strip and the second filler strip has at least one lateral filler edge having a lateral filler edge cross-sectional geometry between a first surface and a second surface, the second surface being opposite the first surface, the lateral filler edge cross-sectional geometry configured to prevent formation of and/or reduce the size of one or more gaps between the adjacent first and second filler strips, wherein each of the first filler strip and the second filler strip defines a longitudinal filler strip axis, wherein the at least one lateral filler edge runs parallel the longitudinal filler strip axis between a first axial end and a second axial end, and wherein the at least one lateral filler edge of the first filler strip is located adjacent to the at least one lateral filler edge of the second filler strip, the at least one lateral filler edge of the first filler strip laterally overlapping and abutting the at least one lateral edge of the second filler strip, and wherein the lateral filler edge cross-sectional geometry of the at least one lateral filler edge of the first filler strip complimentary to the lateral filler edge cross-sectional geometry of the at least one lateral filler edge of the second filler strip extending from the first surface to the second surface.

2. The composite structure of claim 1, wherein the lateral filler edge cross-sectional geometry of the overlapping lateral filler edges of the first filler strip and the second filler strip is non-straight between the first surface and the second surface.

3. The composite structure of claim 2, wherein the lateral filler edge cross-sectional geometry has a chamfer between the first surface and the second surface.

4. The composite structure of claim 1, wherein the at least one lateral filler edge is on both lateral sides of the first filler strip and/or the second filler strip.

5. The composite structure of claim 1, wherein the lateral filler edge cross-sectional geometry of the at least one lateral filler edge of the first filler strip is a double beveled shape having a first straight slope from the first surface to a tip, and a second straight slope from the second surface to the tip.

6. The composite structure of claim 5, wherein the first straight slope and the second straight slope have different lengths and/or slopes.

7. The composite structure of claim 1, wherein the lateral filler edge cross-sectional geometry of the at least one lateral filler edge of the first filler strip includes: a first curved slope from the first surface to a tip, and a second curved slope from the second surface to the tip; or a curved shape having a first curved slope from the first surface to the second surface.

8. The composite structure of claim 7, wherein the first curved slope is convex.

9. The composite structure of claim 7, wherein the first curved slope is concave.

10. The composite structure of claim 7, wherein the first curved slope and/or the second curved slope are convex or concave, or a combination thereof.

11. The composite structure of claim 7, wherein at least one of the first and second filler strips further includes at least one transverse filler edge having a transverse filler edge cross-sectional geometry between the first surface and the second surface, the transverse filler edge cross-sectional geometry configured to prevent formation of and/or reduce the size of one or more gaps between one or more adjacent composite strips, wherein the at least one of the first and second filler strips defines a respective transverse filler strip axis perpendicular to the respective longitudinal filler strip axis, wherein the at least one transverse filler edge runs parallel the respective transverse filler strip axis.

12. The composite structure of claim 1, wherein the first and second filler strips have symmetric lateral filler edges.

13. The composite structure of claim 1, wherein the first and second filler strips have asymmetric lateral filler edges.

14. The composite structure of claim 1, wherein the composite structure includes a plurality of first and second filler strips having one or more overlapping lateral filler edges.

15. The composite structure of claim 1, further comprising a third filler strip and a fourth filler strip disposed adjacent to the third filler strip, wherein each of the third and fourth filler strips has at least one lateral filler edge between a third surface and a fourth surface opposite the third surface, wherein the at least one lateral filler edge is disposed nonorthogonal to the third and fourth surfaces, and wherein the third surface of the fourth filler strip is disposed on the lateral filler edge of the third filler strip.

* * * * *